United States Patent
Park et al.

(10) Patent No.: US 9,403,936 B2
(45) Date of Patent: Aug. 2, 2016

(54) METHOD FOR PREPARING A PITCH FOR CARBON FIBERS AND A PITCH FOR CARBON FIBERS PREPARED BY THE SAME

(71) Applicant: GS Caltex Corporation, Seoul (KR)

(72) Inventors: Sang-Wook Park, Incheon (KR); Young-Se Oh, Busan (KR); Ji-Su Choi, Daejeon (KR); Ki-Ung Kim, Yeosu-si (KR); Sang-Hee Park, Daejeon (KR)

(73) Assignee: GS CALTEX CORPORATION, Seoul (KR)

( * ) Notice: Subject to any disclaimer, the term of this patent is extended or adjusted under 35 U.S.C. 154(b) by 0 days.

(21) Appl. No.: 14/502,461

(22) Filed: Sep. 30, 2014

(65) Prior Publication Data

US 2016/0090441 A1    Mar. 31, 2016

(51) Int. Cl.
*C08F 283/00* (2006.01)
*C08G 61/02* (2006.01)

(52) U.S. Cl.
CPC ..................................... *C08G 61/02* (2013.01)

(58) Field of Classification Search
CPC .............................. C08L 65/02; C08G 61/00
USPC .......... 428/220, 301, 307.7, 339, 317.9, 375, 428/408; 525/416
See application file for complete search history.

(56) References Cited

U.S. PATENT DOCUMENTS

| | | | | |
|---|---|---|---|---|
| 3,821,074 A | * | 6/1974 | Lin et al. | 162/146 |
| 4,146,576 A | * | 3/1979 | Wyss | 423/447.4 |
| 2002/0132106 A1 | * | 9/2002 | Dyer et al. | 428/317.9 |

FOREIGN PATENT DOCUMENTS

| | | | |
|---|---|---|---|
| GB | 1091890 | * | 11/1967 |
| JP | 61028020 A | | 2/1986 |
| JP | 02252798 A | | 10/1990 |
| JP | 04202287 A | | 7/1992 |
| JP | 05132676 A | | 5/1993 |
| JP | 06065580 A | | 3/1994 |
| KR | 10-0244912 B1 | | 2/2000 |

OTHER PUBLICATIONS

Japanese Office Action dated on Jul. 24, 2015 in connection with the counterpart Japanese Patent Application No. 2014-205624.

* cited by examiner

*Primary Examiner* — Terressa Boykin
(74) *Attorney, Agent, or Firm* — Hauptman Ham, LLP

(57) ABSTRACT

A method for preparing a pitch for carbon fibers and a pitch for carbon fibers prepared by the same are disclosed. The method includes introducing a peroxide compound and ozone into a petroleum-process residual oil, followed by heat treatment for reaction. By the method, the pitch for carbon fibers, which exhibits excellent oxidative stabilization and oxidative incompatibility while having a high softening point and high strength, can be obtained at high yield at a relatively low temperature.

12 Claims, 2 Drawing Sheets

| Item | Example 3 | Comparative Example 1 |
|---|---|---|
| Sectional view |  |  |
| Front view |  |  |

METHOD FOR PREPARING A PITCH FOR CARBON FIBERS AND A PITCH FOR CARBON FIBERS PREPARED BY THE SAME

BACKGROUND

1. Technical Field

The present invention relates to a pitch for carbon fibers, and more particularly, to a method for preparing a pitch for carbon fibers, which has a high softening point through radical crosslinking, and a pitch for carbon fibers prepared by the same.

2. Description of the Related Art

Carbon fibers are classified into polyacrylonitrile (PAN)-based carbon fibers, cellulose-based carbon fibers, pitch-based carbon fibers, and phenol resin-based carbon fibers according to raw materials. Among these carbon fibers, the pitch-based carbon fibers are largely classified into mesophase pitch-based carbon fibers and isotropic pitch-based carbon fibers according to the kind of precursor pitch.

The mesophase pitch-based carbon fibers are prepared using a mesophase pitch which is optically anisotropic, as a precursor for carbon fibers, and the isotropic pitch-based carbon fibers are prepared using an isotropic pitch, which is optically isotropic, as a precursor for carbon fibers. The mesophase pitch-based carbon fibers generally exhibit high strength and high elasticity, whereas the isotropic pitch-based carbon fibers exhibit general-purpose properties such as low strength and low elasticity.

However, since the mesophase pitch-based carbon fibers are applied to a limited range such as ultra-high temperature materials and the like, there is a further need for development of an isotropic precursor pitch for preparation of general-purpose carbon fibers. Since the general-purpose carbon fibers require high strength and high elasticity despite low price thereof, more studies of initial raw materials and preparation processes are needed to improve properties thereof.

The pitch-based carbon fibers are generally prepared by fiberization of a precursor pitch through melt spinning using a spinning machine, followed by oxidative stabilization of the fiberized pitch at a temperature from about 150° C. to about 350° C. in an oxidative atmosphere for a predetermined period of time and then treatment at a temperature from about 700° C. to about 3000° C. in an inert atmosphere for a predetermined period of time.

In preparation of carbon fibers, production cost of the carbon fibers depends on price of a precursor pitch, spinnability of the precursor pitch, a rate of oxidative stabilization, carbonization yield after carbonization, and the like. In addition, an oxidative stabilization process requires a longer reaction time than any other individual preparation processes. Thus, development of the precursor pitch exhibiting excellent oxidative stabilization is known to be important.

Examples of a method for preparing an isotropic pitch, which is used as a raw material of isotropic pitch-based carbon fibers and has a softening point of about 200° C. or more, may include a method of removing low molecular weight components from a coal-based pitch through vacuum distillation and solvent extraction, a method of converting low molecular weight components of a raw material into high molecular weight components through simple thermal condensation, and a combination thereof. However, although the isotropic pitch having a relatively narrow molecular weight distribution can be prepared from a raw material having a wide molecular weight distribution by these methods, there are problems in that these methods have low yield and the pitch prepared by these methods has drawbacks in terms of homogeneity and spinnability due to mesophase components remaining upon heating.

Recently, research into use of petroleum refinement residues, which are low-priced and exhibit excellent elastic modulus and thermal and electrical conductivity, as a raw material of the isotropic pitch-based carbon fibers is being actively made. Among such residues, fluidized catalytic cracking decant oil (FCC-DO) and pyrolized fuel oil (PFO), which correspond to petroleum-based raw materials, particularly attract attention as a suitable raw material for high value-added carbon materials, such as high-strength carbon fibers, needle coke, and artificial graphite, due to a high degree of aromatization thereof and a low amount of sulfur and insolubles therein.

Korean Patent Registration Publication No. 0244912 (publication date: Feb. 25, 1999) discloses a method for preparing a high-softening point optically isotropic pitch, in which a pitch capable of being used as a precursor of carbon fibers is prepared by reacting a halogen compound and a radical initiator with a petroleum-based material used as a carbon source.

BRIEF SUMMARY

It is an aspect of the present invention to provide a method for preparing a pitch for high-softening point carbon fibers, which allows a pitch to exhibit improved oxidative stabilization and tensile strength through radical crosslinking of molecules in a petroleum-process residual oil using a specific radical source and to include a low amount of quinoline insolubles (QI), and a pitch for carbon fibers prepared by the same.

In accordance with one aspect of the present invention, a method for preparing a pitch for carbon fibers includes introducing a peroxide compound and ozone into a petroleum-process residual oil, followed by heat treatment for reaction.

In accordance with another aspect of the present invention, a pitch for carbon fibers has a high softening point from 250° C. to 320° C., a weight average molecular weight from about 1,000 to about 10,000, and an oxygen take-up of about 106% or less.

In accordance with a further aspect of the present invention, a pitch for carbon fibers includes about 5% by weight (wt %) or less of quinoline insolubles (QI).

According to the present invention, the method for preparing a pitch for carbon fibers provides the following effects.

First, the method is a novel technology for preparing a pitch by creation of hydroxyl radicals (.OH) using the peroxide compound and ozone as a radical source.

Second, oxidative stabilization time can be reduced due to reduced oxygen take-up of pitch molecules by increasing a molecular weight of the pitch through radical crosslinking.

Third, the produced carbon fibers exhibits improved tensile properties due to condensed aromatic groups, which have σ-bonds, aligned in a fiber direction through radical crosslinking.

Fourth, since the method prevents agglomeration of asphaltene due to high temperature polymerization and suppresses formation of incompatible components due to oxidation of raw materials, the prepared pitch exhibits high fiber applicability.

Fifth, since water ($H_2O$) and alcohol are produced as by-products of radical polymerization using the peroxide compound and ozone, an environmentally friendly process can be secured.

Sixth, the method can secure relatively high yield at a low temperature from about 100° C. to about 200° C. without a separate catalyst.

According to the present invention, the pitch for carbon fibers exhibits excellent oxidative stabilization and oxidative incompatibility while having a high softening point and high strength, and includes a low amount of quinoline insolubles (QI).

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Figure 1:
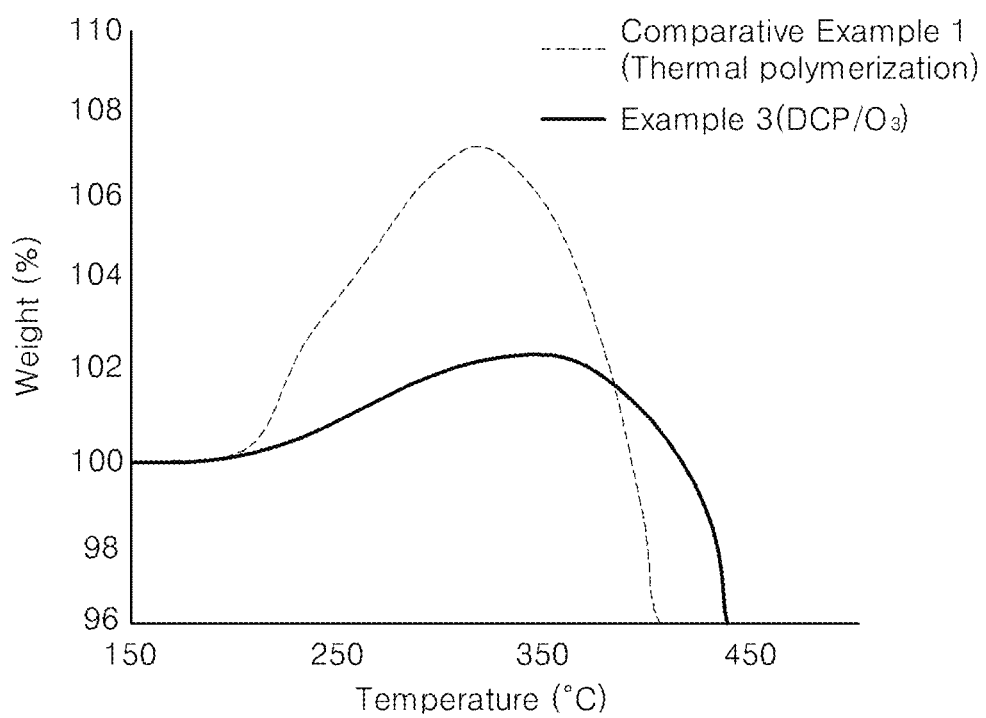
FIG. 1 shows thermogravimetric curves of pitches obtained in Example 3 and Comparative Example 1, in air, respectively.

Hereinafter, embodiments of the present invention will be described in detail with reference to the accompanying drawings. It should be understood that the present invention is not limited to the following embodiments and may be embodied in different ways, and that the embodiments are provided for complete disclosure and thorough understanding of the invention by those skilled in the art. Therefore, the scope and sprit of the present invention should be defined only by the accompanying claims and equivalents thereof. Like components will be denoted by like reference numerals throughout the specification.

A method for preparing a pitch for carbon fibers according to one embodiment of the present invention will be described in detail with reference to the accompanying drawings.

According to one embodiment of the present invention, the method for preparing a pitch for carbon fibers includes introducing a peroxide compound and ozone into a petroleum-process residual oil, followed by heat treatment for radical polymerization.

Here, the petroleum-process residual oil is a carbon source of a pitch for carbon fibers, and may be a residual oil obtained as a by-product of naphtha cracking, that is, naphtha cracking bottom (NCB) oil.

Naphtha cracking bottom oil may include pyrolized fuel oil (PFO). Pyrolized fuel oil (PFO) is produced at a bottom of a naphtha cracking center (NCC), and is suitable for the method for preparing a pitch for carbon fibers according to the present invention due to a high degree of aromatization thereof and a plentiful amount of resins therein.

Pyrolized fuel oil (PFO) includes various aromatic hydrocarbons, and includes about 25% to about 35% of derivatives of naphthalene and methylnaphthalene. Examples of the derivatives of naphthalene and methylnaphthalene may include ethylbenzene, 1-ethenyl-3-methyl benzene, indene, 1-ethyl-3-methyl benzene, 1-methylethylbenzene, 2-ethyl-1, 3-dimethylbenzene, propylbenzene, 1-methyl-4-(2-propenyl)benzene, 1,1a,6,6a-tetrahydro-cycloprop[a]indene, 2-ethyl-1H-indene, 1-methyl-1H-indene, 4,7-dimethyl-1H-indene, 1-methyl-9H-fluorene, 1,7-dimethylnaphthalene, 2-methylindene, 4,4'-dimethylbiphenyl, naphthalene, 4-methyl-1,1'-biphenyl, anthracene, 2-methylnaphthalene, 1-methylnaphthalene, and the like.

According to the present invention, the petroleum-process residual oil, that is, the carbon source may be subjected to removal of low-boiling point materials. The low-boiling point materials do not participate in reaction due to volatilization of most components thereof and thus provide an extremely low pitch yield, and include $C_4$ to $C_{20}$ hydrocarbons. According to the present invention, when the carbon source subjected to removal of the low-boiling point materials is used, the carbon source can be prepared into a high-softening point pitch at higher yield.

According to the present invention, the peroxide compound and ozone ($O_3$) are a radical source, and create hydroxyl radicals (.OH) by thermal cracking.

For example, the peroxide compound may include at least one of dicumylperoxide (DCP), hydrogen peroxide, benzoyl peroxide, cumene hydroperoxide, t-butyl hydroperoxide, and methyl ethyl ketone peroxide.

The peroxide compound may be introduced in an amount of about 5 parts by weight to about 50 parts by weight based on 100 parts by weight of the petroleum-process residual oil. In addition, the ozone may be supplied in a gaseous state at a partial pressure from about 20 g/m$^2$ to about 100 g/m$^2$, preferably of about 25.8 g/m$^2$.

If the amount of the peroxide compound is less than about 5 parts by weight or the partial pressure of ozone is less than about 20 g/m$^2$, it can be difficult to prepare a desired pitch due to a low amount of created radicals that participate in reaction.

On the other hand, if the amount of the peroxide compound is greater than about 50 parts by weight or the partial pressure of ozone is greater than about 100 g/m$^2$, although a large amount of radicals are created, incompatible components can be formed due to oxidation of raw materials.

Next, radical polymerization according to the present invention will be described in detail with reference to Target Reaction Formula 1.

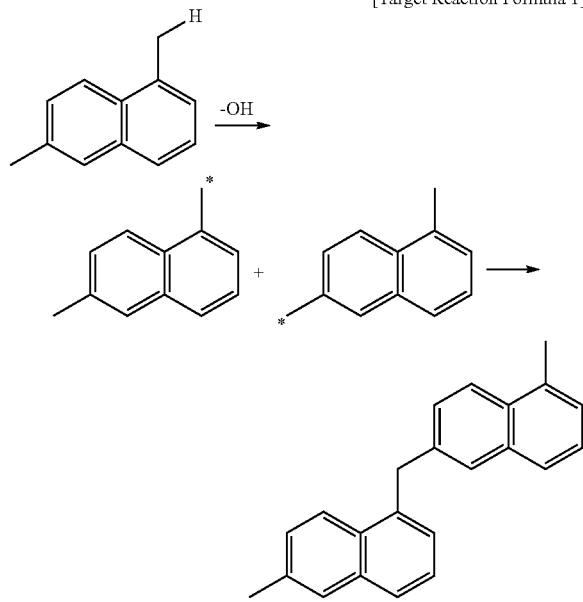

[Target Reaction Formula 1]

First, according to the present invention, the peroxide compound and ozone, which are the radical source, are introduced into a raw material such as the petroleum-process residual oil, which is the carbon source.

During this process, the petroleum-process residual oil and the peroxide compound may be introduced into a reactor and mixed with each other therein, followed by introducing gaseous ozone into the reactor while the partial pressure of gaseous ozone is kept constant. In a state in which the petroleum-process residual oil and the peroxide compound are mixed or ozone is introduced, stirring may also be further performed.

Next, heat treatment is performed in a state of introduction of ozone, thereby driving radical polymerization.

When heat treatment is performed, first, gas and light oil are discharged to the outside due to thermal cracking occurring in the petroleum-process residual oil while the hydroxyl radicals (.OH) are created from the peroxide compound and ozone.

Next, since molecules in the petroleum-process residual oil having an aromatic structure are radical-crosslinked by the created hydroxyl radicals (.OH), the molecules in the petroleum-process residual oil are polycondensed along with chain extension thereof. As a result, an isotropic pitch having a high softening point of about 250° C. or more, preferably from about 250° C. to about 320° C., is finally synthesized. This result can be confirmed from Table 1 and FIGS. 1 and 2.

According to the present invention, during polycondensation through radical crosslinking, condensed polycyclic aromatic groups having a large number of aromatic structures in a long chain are formed.

Radical vulcanization is mainly used in crosslinking of polymers, since branched aromatic groups exhibit higher resonance stabilization than polymers and thus allow easy bonding and separation between radicals and hydrogen atoms in a chain.

According to the present invention, since bonding of aromatic hydrocarbons in the petroleum-process residual oil is derived through radical vulcanization described above, a weight average molecular weight of a pitch having a linear molecular series formed therein can be increased to about 1,000 to about 10,000.

According to the present invention, since the prepared pitch has a weight average molecular weight from about 1,000 to about 10,000 and includes quinoline insolubles (QI) in a low amount of about 5 wt % or less (preferably about 0 wt %), the pitch exhibits excellent spinnability and carbon fibers prepared therefrom exhibit excellent tensile strength and modulus.

Since increase in molecular weight of the pitch can reduce oxidative stabilization time by reducing oxygen take-up of pitch molecules, a precursor pitch exhibiting excellent oxidative stabilization can be prepared as a result. Reduction in oxygen take-up along with increase in the molecular weight of the pitch can be confirmed from Table 1.

In addition, linear molecules of the condensed polycyclic aromatic groups formed by σ-bonding between aromatic compounds created during polycondensation through radical crosslinking are aligned in a fiber direction. Therefore, carbon fibers prepared using this pitch can exhibit improved properties such as tensile strength and the like. This result can be confirmed from Table 2.

To derive radical polymerization through creation of the hydroxyl radicals (.OH) and radical crosslinking, heat treatment may be performed at a temperature from about 100° C. to about 200° C.

If the heating temperature is less than 100° C., it can be difficult to create the hydroxyl radicals (.OH) from the peroxide compound and ozone. Conversely, if the heating temperature is greater than about 200° C., since chain extension is terminated, it can be difficult to prepare pitch having a desired molecular weight.

Further, reaction may be performed for about 1 hour to about 10 hours. If the reaction time is less than about 1 hour, sufficient reaction cannot be obtained. Conversely, if the reaction time is greater than about 10 hours, there is a problem of solidification during reaction.

It should be understood that heat treatment in the presence of ozone includes not only heat treatment after supplying ozone, but also heat treatment while supplying ozone.

As shown in Table 1, according to the present invention, a relatively high polymerization yield of about 20% or more can be obtained by increase in the molecular weight of the pitch through radical polymerization using the hydroxyl radicals (.OH) at a low temperature from about 100° C. to about 200° C. without a separate catalyst.

Figure 2:
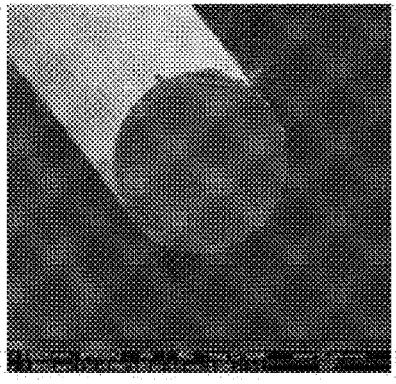
FIG. 2 shows scanning electron microscope (SEM) images of carbon fibers prepared using pitches prepared in Example 3 and Comparative Example 1, respectively.
Figure 2:
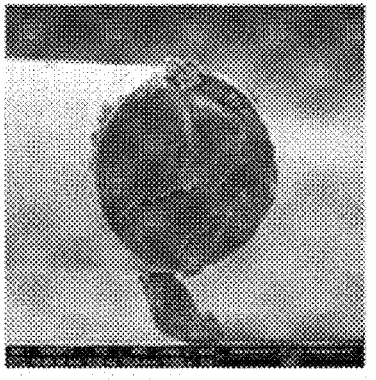
Figure 2:
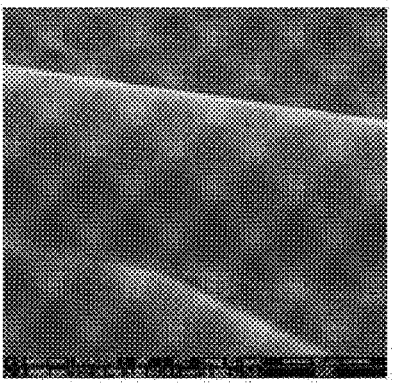
Figure 2:
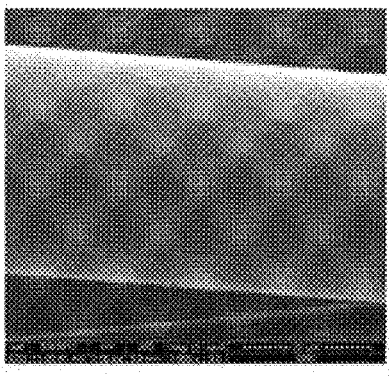

Furthermore, as shown in FIG. 2, since agglomeration of asphaltene due to high temperature polymerization can be prevented and formation of incompatible components due to oxidation of the raw materials can be suppressed, there is a merit in that the pitch exhibits excellent oxidative incompatibility and thus high applicability to fibers.

Furthermore, in the pitch preparation method, although not shown in the drawings, water ($H_2O$) and alcohol are created as by-products of radical polymerization due to the use of the peroxide compound and ozone as the radical source. Since such by-products are harmless to human health, an environmentally friendly process can be secured.

According to the present invention, when the petroleum-process residual oil is used without removal of the low-boiling point materials, second heat treatment for removing the low-boiling point materials by heating the reaction-completed resulting material may be further performed.

In this case, second heat treatment through heating the reaction-completed resulting material may be performed at a temperature from about 300° C. to about 400° C. If the temperature of second heat treatment is less than about 300° C., it can be difficult to achieve sufficient removal of the low-boiling point materials. Conversely, if the temperature of second heat treatment is greater than about 400° C., there are problems of cracking and rapid coking causing loss of reaction products.

In addition, second heat treatment for removing the low-boiling point materials may be performed for about ½ hours to about 10 hours. If the second heat treatment time is less than about ½ hours, it is difficult to sufficiently remove the low-boiling point materials. Conversely, if the second heat treatment time is greater than about 10 hours, there are problems of coking and cracking.

As described above, the pitch preparation method provides a pitch for carbon fibers, which exhibits excellent oxidative stabilization and oxidative incompatibility while securing a high softening point and high strength.

Therefore, the pitch according to the present invention can be used as raw materials and precursors of highly functional carbon materials such as carbon fibers, binder materials of carbon-carbon composites, carbon materials for anodes of lithium ion secondary batteries, and the like.

EXAMPLES

Hereinafter, the present invention will be described in more detail with reference to some examples. It should be understood that these examples are provided for illustration only and are not to be construed in any way as limiting the present invention. A description of details apparent to those skilled in the art will be omitted for clarity.

(1) Preparation of Pitch

Examples 1 to 10

Pyrolized fuel oil (PFO) and either dicumylperoxide (DCP) or hydrogen peroxide were introduced into a reactor to be mixed, followed by heat treatment for radical polymerization while supplying ozone ($O_3$) gas.

After completion of radical polymerization, unreacted or low-reactive molecules were removed by passing nitrogen gas through the resulting material at a flow rate of 2 L/min for a predetermined period of time, thereby preparing a pitch according to Examples 1 to 10.

Reaction conditions for each of Examples are as shown in Table 1.

Comparative Example 1

Pyrolized fuel oil (PFO) was introduced into a reactor, followed by heat treatment for thermal polymerization in a nitrogen atmosphere.

After completion of thermal polymerization, unreacted or low-reactive molecules were removed by passing nitrogen gas through the resulting material at a flow rate of 2 L/min for 5 hours, thereby obtaining a pitch.

Reaction conditions for Comparative Example are as shown in Table 1.

(2) Evaluation of Properties of Pitch

Each of the pitch samples obtained in Examples 1 to 10 and Comparative Example 1 was evaluated as to softening point, molecular weight, oxygen take-up, toluene insoluble (TI) content, quinoline insoluble (QI) content, beta-resin (TI-QI) content, and yield. Results are shown in Table 1.

Each of the pitch samples obtained in Example 3 and Comparative Example 1 was subjected to thermogravimetric (TG) analysis in air. Results are shown in FIG. 1.

Here, yield refers to a degree of polymerization.

FIG. 1 shows thermogravimetric curves of pitch samples, which were obtained in Example 3 and Comparative Example 1, in air, respectively.

properties in terms of softening point and yield. In addition, it can be seen that all of the pitch samples of Examples 1 to 10 exhibited significantly low oxygen take-up due to a significantly increased molecular weight as compared with the pitch of Comparative Example 1 using thermal polymerization and also exhibited improved yield.

From comparison of the pitch samples of Examples 1 to 3, it can be seen that yield was optimized when the reaction time in PFO modification was 5 hours, and that molecular weight was increased in proportion to reaction time.

From comparison of the pitch samples of Examples 3, 5 and 7, it can be seen that since there was no significant change in yield and molecular weight despite increased ozone concentration, excess ozone beyond that required for reaction is unnecessary.

From comparison of the pitch samples of Examples 3 and 9, it can be seen that, when DCP was used, the pitches had reduced molecular weight and yield as the heat treatment temperature was increased. This is because DCP exhibited an extremely fast cracking rate at about 170° C. and thus could not sufficiently participate in reaction due to a difference in cracking rate of DCP depending upon temperature.

From comparison of the pitch samples of Examples 3 and 4, it can be seen that when hydrogen peroxide and ozone were simultaneously present, the pitch had a higher yield than the pitch obtained when DCP and ozone were simultaneously present.

From comparison of the pitch samples of Examples 4, 6 and 8, it can be seen that, when hydrogen peroxide was used, excess ozone beyond that required for reaction is unnecessary since there was also no significant change in yield and molecular weight despite increased ozone concentration.

From comparison of the pitch samples of Examples 4 and 10, it can be seen that yield was increased, since cracking of hydrogen peroxide was facilitated as the heat treatment temperature was increased.

From the results of the pitch samples of Examples 1 to 10, it can be seen that the molecular weight of the pitch was increased as yield was increased.

Referring to Table 1, it can be seen that since all of the pitch samples of Examples 1 to 10, which used $O_3$ and either DCP

TABLE 1

| | Process conditions | | | | | | | | | | | |
|---|---|---|---|---|---|---|---|---|---|---|---|---|
| | Carbon source | Radical source | | | Heat | | | | | | Beta- | |
| Item | PFO (g) | DCP (g) | Hydrogen peroxide (g) | $O_3$ concentration (g/m$^2$) | treatment temp. (° C.) | Reaction time (hr) | Softening point (° C.) | Molecular weight (Mw) | Oxygen take-up (%) | TI content (wt %) | QI content (wt %) | resin content (wt %) | Yield (%) |
| Example 1 | 1800 | 90 | — | 25.8 | 150 | 1.15 | 292 | 1175 | 105.5 | 46 | 4.5 | 41.5 | 20 |
| Example 2 | 1800 | 90 | — | 25.8 | 150 | 2.5 | 296 | 1188 | 105.2 | 46 | 2 | 44 | 20.6 |
| Example 3 | 1800 | 90 | — | 25.8 | 150 | 5 | 289 | 1287 | 103.3 | 49 | 0 | 49 | 24.3 |
| Example 4 | 1800 | — | 200 | 25.8 | 150 | 5 | 287 | 1378 | 103.1 | 50 | 0 | 50 | 26.4 |
| Example 5 | 1800 | 90 | — | 40.2 | 150 | 5 | 291 | 1312 | 103.4 | 50 | 0 | 50 | 24.6 |
| Example 6 | 1800 | — | 200 | 40.2 | 150 | 5 | 283 | 1398 | 102.9 | 48 | 0 | 48 | 26.9 |
| Example 7 | 1800 | 90 | — | 81.6 | 150 | 5 | 289 | 1324 | 103 | 48 | 0 | 48 | 24.9 |
| Example 8 | 1800 | — | 200 | 81.6 | 150 | 5 | 295 | 1457 | 104.1 | 53 | 0 | 53 | 27.1 |
| Example 9 | 1800 | 90 | — | 25.8 | 170 | 5 | 293 | 1235 | 103.9 | 47 | 0 | 47 | 23.3 |
| Example 10 | 1800 | — | 200 | 25.8 | 170 | 5 | 291 | 1541 | 102.5 | 55 | 0 | 55 | 28.2 |
| Comparative Example 1 | 1800 | — | — | — | 150 | 5 | 290 | 817 | 107.9 | 42 | 26 | 16 | 19 |

Referring to Table 1 and FIG. 1, it can be seen that all of the pitch samples of Examples 1 to 10, which used $O_3$ and either DCP or hydrogen peroxide as a radical source, satisfied target or hydrogen peroxide as the radical source, included a low amount of quinoline insolubles (QI), the pitch samples of Examples 1 to 10 exhibited excellent spinnability.

(3) Preparation of Carbon Fibers

Carbon fibers were prepared using the pitches prepared in Example 3 and Comparative Example 1 through spinning, oxidation and carbonization corresponding to typical methods.

Next, a front side and a cross-section of each of the prepared carbon fibers were observed using a scanning electron microscope (SEM).

FIG. 2 shows scanning electron microscope (SEM) images of carbon fibers prepared using the pitches prepared in Example 3 and Comparative Example 1, respectively.

As shown in FIG. 2, it could be confirmed that, when the pitch of Example 3 satisfying the preparation conditions of the present invention was used, sphere-shaped incompatible components were scarcely formed and the finally prepared carbon fibers exhibited isotropy.

Conversely, it could be seen that, when the pitch of Comparative Example 1 using thermal polymerization was used, a large amount of sphere-shaped incompatible components was formed although the finally prepared carbon fibers also exhibited isotropy.

(4) Tensile Strength and Modulus of Carbon Fibers

Each of carbon fibers A1 to A10 using the pitch prepared in Example 3 and carbon fibers B1 to B10 using the pitch prepared in Comparative Example 1 was evaluated as to tensile strength and modulus. Results are shown in Table 2.

Here, modulus refers to elastic modulus (Young's modulus).

TABLE 2

|  | Tensile strength (GPa) | Modulus GPa) |  | Tensile strength (GPa) | Modulus (GPa) |
| --- | --- | --- | --- | --- | --- |
| A1 | 0.7809 | 41.2025 | B1 | 0.3026 | 30.7990 |
| A2 | 0.6643 | 38.2758 | B2 | 0.2548 | 24.7686 |
| A3 | 0.8405 | 56.7751 | B3 | 0.3562 | 28.7199 |
| A4 | 0.6954 | 38.9946 | B4 | 0.4017 | 32.1173 |
| A5 | 0.6379 | 34.4888 | B5 | 0.3273 | 31.1612 |
| A6 | 0.5917 | 52.9396 | B6 | 0.2580 | 28.1755 |
| A7 | 0.7323 | 41.8402 | B7 | 0.2700 | 16.6649 |
| A8 | 0.8900 | 50.2210 | B8 | 0.1770 | 23.1463 |
| A9 | 0.8452 | 45.7325 | B9 | 0.3075 | 26.1951 |
| A10 | 0.7381 | 44.3329 | B10 | 0.2861 | 30.7997 |
| Average | 0.7416 | 44.0803 | Average | 0.2941 | 27.2247 |

Referring to Table 2, it could be confirmed that the carbon fibers prepared using the pitch of Example 3 exhibited significantly higher average tensile strength and average modulus than the carbon fibers prepared using the pitch of Comparative Example 1 and had high strength corresponding to an average tensile strength of 0.7416 GPa and high elasticity corresponding to an average modulus of 44.0803 GPa.

Although the present invention has been described with reference to some embodiments, it should be understood that various modifications, changes, alterations, and equivalent embodiments can be made by those skilled in the art without departing from the spirit and scope of the invention. Therefore, the scope of the invention should be limited only by the accompanying claims and equivalents thereof.

What is claimed is:

1. A method for preparing a pitch for carbon fibers, comprising:
   introducing a peroxide compound and ozone into a petroleum-process residual oil, followed by heat treatment together at a temperature from about 100° C. to about 200° C. for reaction.

2. The method according to claim 1, wherein the peroxide compound comprises at least one of dicumylperoxide (DCP), hydrogen peroxide, benzoyl peroxide, cumene hydroperoxide, t-butyl hydroperoxide, and methyl ethyl ketone peroxide.

3. The method according to claim 1, wherein the ozone has a partial pressure from about $20g/m^2$ to about $100g/m^2$.

4. The method according to claim 1, wherein the reaction is performed for about 1 hour to about 10 hours.

5. The method according to claim 1, comprising:
   performing thermal cracking to create hydroxyl radicals (.OH) from the peroxide compound and ozone; and
   performing crosslinking and polycondensation in which molecules in the petroleum-process residual oil are radical-crosslinked via the hydroxyl radicals (.OH) and thus subjected to chain extension.

6. The method according to claim 1, wherein the petroleum-process residual oil comprises naphtha cracking bottom oil.

7. The method according to claim 6, wherein the naphtha cracking bottom oil comprises pyrolized fuel oil (PFO).

8. The method according to claim 1, wherein the peroxide compound is introduced in an amount of about 5 parts by weight to about 50 parts by weight based on 100 parts by weight of the petroleum-process residual oil.

9. The method according to claim 1, wherein the petroleum-process residual oil comprises a petroleum-process residual oil subjected to removal of low-boiling point materials.

10. The method according to claim 1, further comprising:
    performing heat treatment for removing low-boiling point materials by heating the reaction-completed resulting material.

11. The method according to claim 10, wherein heat treatment for removing the low-boiling point materials is performed at a temperature from about 300° C. to about 400° C.

12. The method according to claim 10, wherein heat treatment for removing the low-boiling point materials is performed for about ½ hours to about 10 hours.

* * * * *